June 11, 1946.  W. F. SIMPSON  2,401,976
SECURING PIN
Filed Sept. 20, 1944
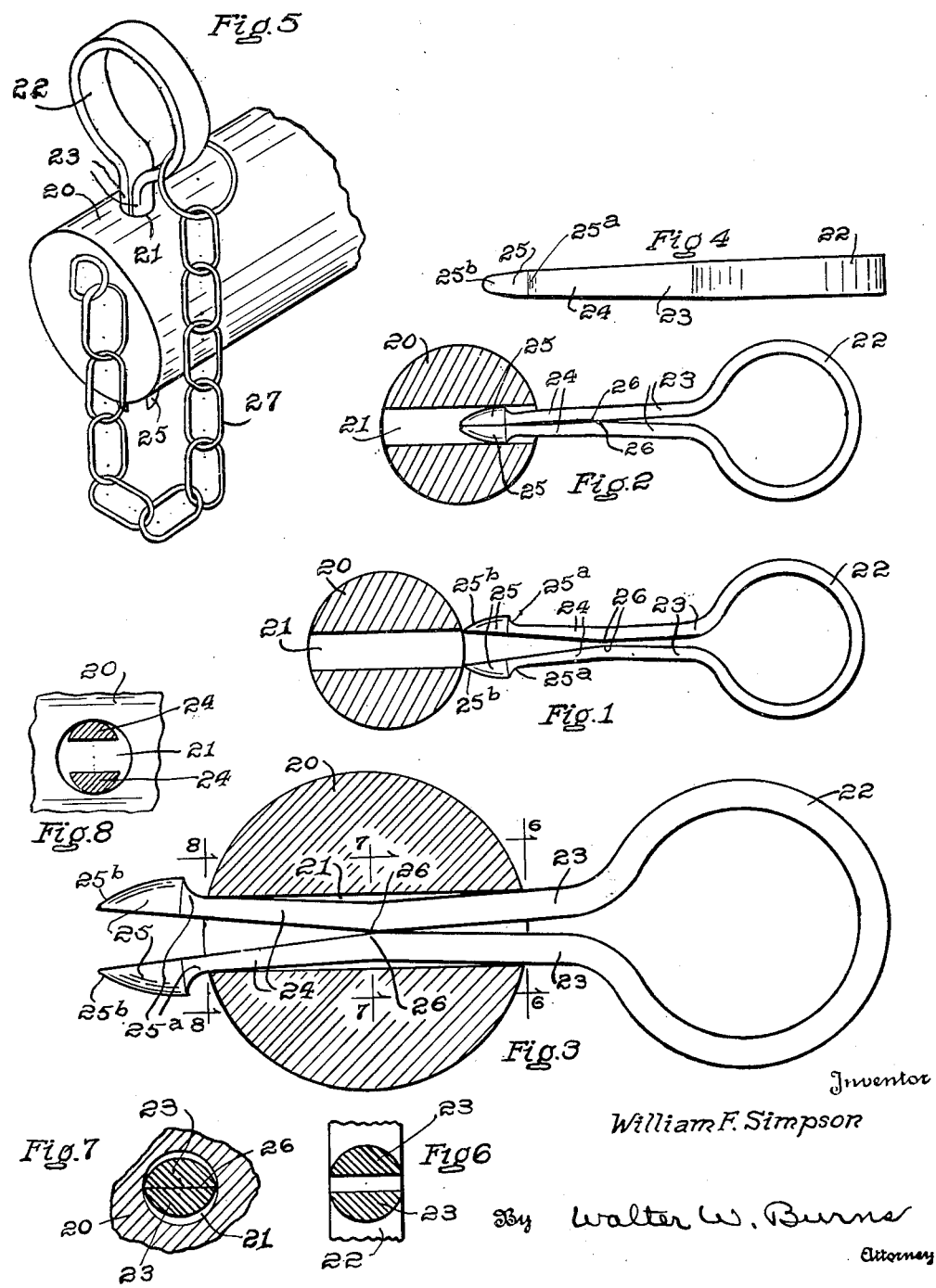
Inventor
William F. Simpson
By Walter W. Burns
Attorney Patented June 11, 1946

2,401,976

UNITED STATES PATENT OFFICE 2,401,976

SECURING PIN

William F. Simpson, Louisville, Ky., assignor to B. F. Avery & Sons Company, Louisville, Ky., a corporation of Kentucky Application September 20, 1944, Serial No. 554,982

3 Claims. (Cl. 85—8.5)

This invention relates to securing pins and has particular relation to pins which may be readily removed.

In some types of machinery where relatively light retaining means are desired to hold portions of the machinery securely in proper place, it is desirable that a means be used which may be readily removed. The ordinary cotter pin while effective as a securing means is not as readily removable as is sometimes desirable as for example with an agricultural implement out in the field with no tools available.

The primary object of the invention is the provision of an improved securing pin.

Another object of the invention is the provision of a securing pin having a loop opening large enough to admit the insertion of a finger of the operative.

A still further object of the invention is the provision of a securing pin having legs which are resilient, having portions of the legs at one angle to each other and having other portions at a greater angle.

Still another object of the invention is the provision of a securing pin having legs which substantially fill one end of the opening in which it is to be inserted, having surfaces resiliently contacting with each other intermediate the leg ends and enlarged ends for engagement with the edges of the opening, causing the pin to be tight at both ends of the opening when inserted.

Another and still further object of the invention is the provision of a securing pin having a safety means to prevent accidental loss when removed.

Other and further objects will be apparent to those skilled in the art from a reading of the complete specification.

Referring to the drawing wherein a preferred embodiment of the invention is illustrated, Fig. 1 is a side view of the securing pin in position to be entered in the opening.

Fig. 2 is a view similar to Fig. 1, but illustrating the securing pin after it has entered the opening.

Fig. 3 is a greatly enlarged view illustrating the securing pin in its fully operative position.

Fig. 4 is a side view of the securing pin.

Fig. 5 is a perspective view.

Figs. 6, 7 and 8 are detail cross-sectional views taken on the lines 6—6, 7—7 and 8—8 of Fig. 3 respectively.

Similar reference characters refer to the same or similar parts throughout the specification and drawing.

The reference character 20 designates a shaft or bar having an opening 21 through which the securing pin is to be passed to secure the desired parts of the machine in place.

The pin has a loop portion 22 at its end which serves as a handle for the insertion and removal of the pin. This loop 22 is illustrated as having an opening sufficiently large to permit the operative of the machine to readily insert his finger to hold the pin during insertion and removal operations. In addition to the function of the loop as a handle, this loop supplies a small portion of the resiliency and provides a holder for the legs which are preferably integral therewith.

Those portions 23 of the legs adjacent the loop 22 serve as a shank to carry the expanding portions 24. It is to be noted that the outer or expanding portions 24 are flared or in other words, the relative angle between them is greater than the angle between the shank portions 23. It will be noted also that these expanding portions 24 are illustrated as being, although not necessarily so, of lighter cross section than the shank portions. This construction aids the expansion action at the lower or outer end of the pin.

The ends of the expanding portions 24 of the legs, are enlarged as at 25. It is to be noted that the enlargements 25 are provided with portions which taper toward the extreme end of the point of the pin.

In Fig. 1 where the pin is in position to be, but has not been inserted, the points at the end of the tapered portions 25$^b$ are in a position to enter the opening 21. It is preferable that the securing pin be so constructed that the points will be close enough together so that they will enter the opening without the necessity of the operative having to compress the ends in order to permit the points to enter the opening 21. This is particularly advantageous where the pin is to be used in openings through a hollow pipe or shaft. In this latter case, it would be difficult to compress the ends of the pin since the ends would be within the hollow shaft and could not be readily reached.

In Fig. 1, where the securing pin is not under stress, it will be noted that at the outer ends of the shanks 23, where the expanding portions 24 begin, the two legs are nearly in contact with each other—at 26. When the ends of the securing pin are inserted in the opening, the legs come into contact with each other at 26 after which the expanding portions 24 take the most of the compression strains until the enlarged ends 25 are within the opening 21. Further movement of the securing pin brings the enlarged ends 25 to the opposite end of the opening. As these enlarged ends emerge from the opening 21, the expanding portions 24 expand so that the opposite sides of the opening 21 are engaged by the tapered shoulders 25a with the result that the pin is securely held in place.

It has been pointed out that the loop 22 supplies only a small portion of the resiliency of the pin. If a pin were constructed with legs of the ordinary type but with a loop large enough to insert the finger, the resiliency would be ample but with the large loop, the expanding force would be greatly decreased. However with the present invention, ample expansive force is supplied by the expanding portions 24 about the contacting place 26, as already pointed out.

The cross-section of the securing pin taken adjacent the loop, relative to the size of the opening 21 should be such that, if the legs of the pin do not completely fill the opening they should so nearly fill it and be of such proportions as to exert an outward pressure sufficient to impinge against the opposite sides of the opening 21. Such a construction makes for a secure holding and tends to prevent movement in the opening with consequent wear.

It is thus clear that the construction of this invention provides a firmly held securing pin. But of nearly equal importance, in the field of agricultural implements, for example, is the ability of the operative to remove the pin without the use of any tools. By placing the operative's finger in the opening of the loop 22, a sharp pull will result in the pin being removed. As the operative pulls on the loop 22, the tapered shoulders 25a cause the enlarged portions 25 to be drawn together inwardly and through and outwardly and clear of the opening 21.

In order to provide a safety means to prevent loss of the securing pin while removed from the opening 21, there is provided the safety chain 27 which is secured at one end to the loop 22, the other end being for attachment adjacent the opening 21, to prevent loss of the securing pin.

While I have illustrated and described in detail an embodiment of the invention, it is to be understood that the disclosure is merely illustrative and that modification and changes may be made without departing from the spirit of the invention and within its scope as claimed.

Having described the invention, what I claim is:

1. A securing pin for insertion in an opening comprising a pair of legs secured together by an enlarged loop portion of sufficient size to insert a finger, each leg having an enlarged end forming tapered retaining shoulders, the legs being of a size substantially to close one end of the opening and being bowed sufficiently to cause when in operative position, a resiliently pressed contact between the legs at a place intermediate their ends and to force the legs, adjacent to the shoulders, away from each other against opposite sides of the other end of the opening each leg from its shoulder to the loop being composed of two straight portions at an angle to each other in the form of a widened angle.

2. A securing pin for insertion in an opening, comprising a loop portion of sufficient size to insert a finger, legs extending from the loop portions, enlarged tapered portions on the ends of the legs forming retaining shoulders, the leg portions being of a size to engage opposite sides of the opening, and being bowed sufficiently to cause when in operative position, a resiliently pressed contact between the legs at a place intermediate their ends and to force the legs, adjacent to the shoulders, away from each other against opposite sides of the other end of the opening each leg from its shoulder to the loop being composed of two straight portions at an angle to each other in the form of a widened angle.

3. A securing pin for insertion in an opening, comprising a loop portion of a size to permit insertion of the finger of the operative, legs extending from the loop and having enlarged portions at their ends, the enlarged portions being tapered inwardly toward its leg and outwardly toward its point, the legs being so shaped that when in the inserted position, they will have a resiliently pressed contact point with each other at a place intermediate the loop and enlarged portions, thus resiliently forcing the enlarged portions apart against the edge of the opening, each leg from its shoulder to the loop being composed of two straight portions at an angle to each other in the form of a widened angle and a safety chain attached at one end to the loop and for attachment at its other end adjacent the opening.

WILLIAM F. SIMPSON.